3,197,773
FREQUENCY MODULATED CONTINUOUS
WAVE NAVIGATION RADAR
Stanley H. Black and Donald Littler, Santa Clara, Calif.,
and P. Gene Smith, Sudbury, Mass., assignors to Sperry
Rand Corporation, Great Neck, N.Y., a corporation of
Delaware
Filed Apr. 19, 1962, Ser. No. 188,754
9 Claims. (Cl. 343—9)

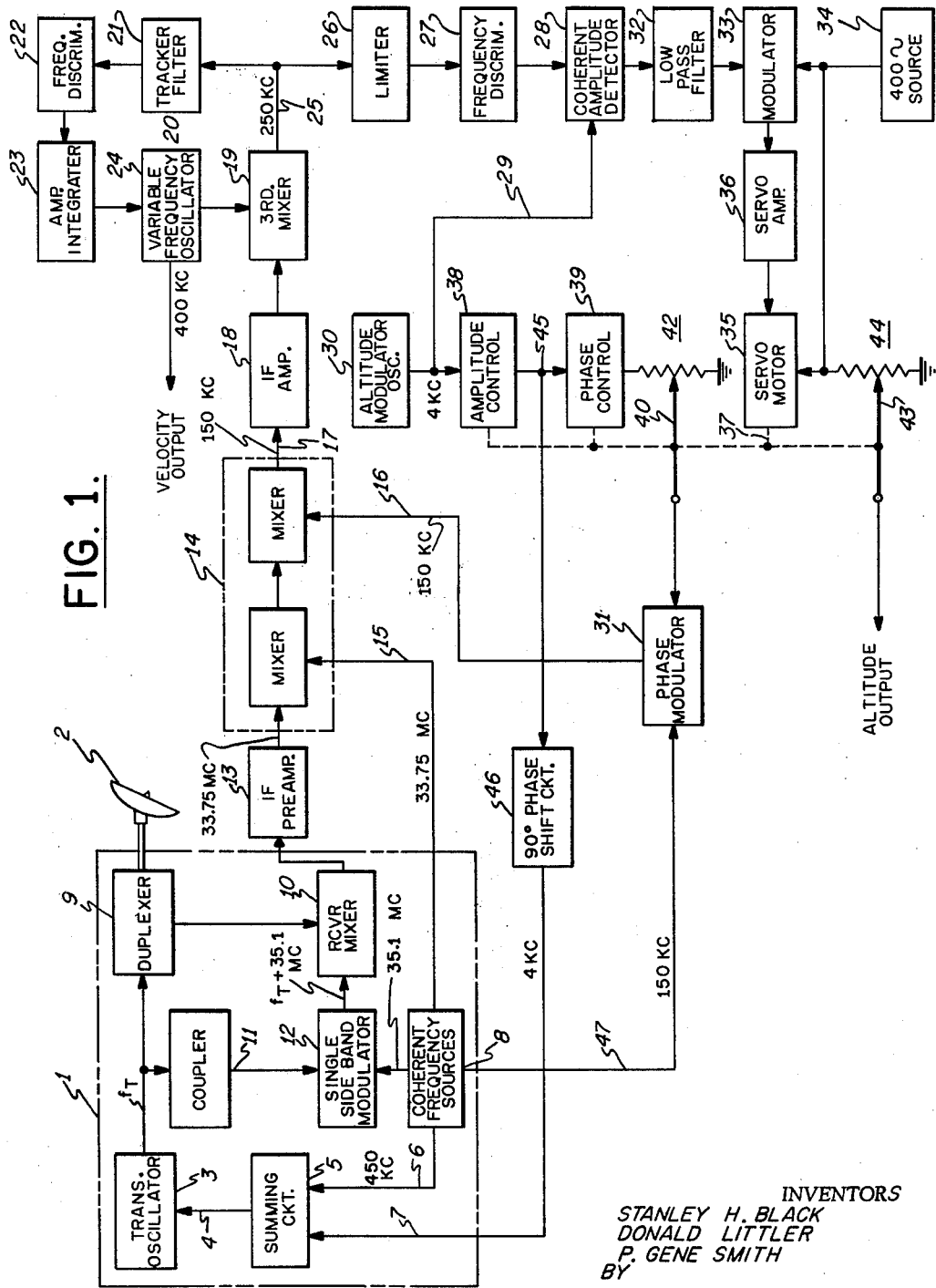

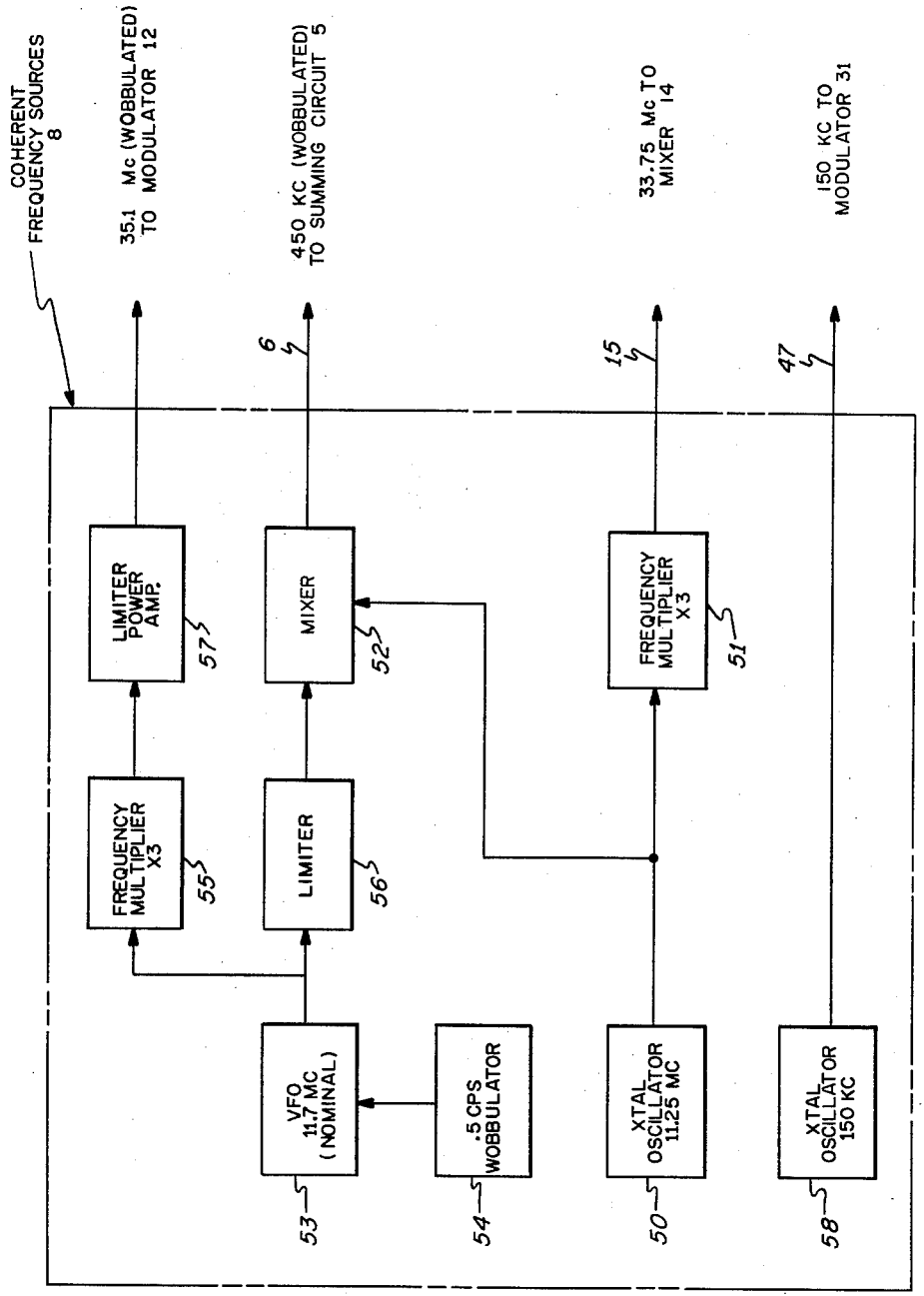

The present invention generally relates to radars adapted for navigational purposes and, more particularly, to a navigational radar of the frequency modulated continuous wave type.

Air-borne radar apparatus for producing navigational data such as aircraft ground speed and altitude have been available in varying degrees of accuracy and complexity. With the advent of high speed, high altitude jet aircraft, however, the requirement for increased accuracy over wider ranges of measured data values has become more critical than before. To meet the substantially increased performance specifications for airborne navigational radars, intensified interest has been directed to radar equipment of the frequency modulated continuous wave type. Such radars have the capability for improved accuracy of velocity measurement and for the continuous determination of aircraft altitude down to zero altitude.

One typical embodiment of a frequency modulated continuous wave (FMCW) radar for deriving aircraft velocity data is discussed in the paper, "Doppler Navigational Radar Utilizing New Techniques," by Burton L. Cordry, presented at the Sixth Annual East Coast Conference on Aeronautical and Navigational Electronics, October 26–28, 1959. A representative FMCW system for obtaining aircraft altitude data is described in U.S. Patent 2,268,587, issued to G. Guanella on January 6, 1942.

It is the principal object of the present invention to provide radar apparatus of the FMCW type for simultaneously determining the velocity and range of a reflecting object relative to said radar apparatus.

Another object is to provide navigational radar apparatus of the FMCW type for simultaneously deriving aircraft velocity and aircraft altitude data.

A further object is to provide auxiliary receiver means fully compatible with a FMCW velocity measuring radar for obtaining range data.

Another object is to provide a FMCW radar altimeter of improved accuracy.

A further object is to provide radar navigational apparatus for determining aircraft velocity data and aircraft altitude data substantially independently of each other while simultaneously sharing a major portion of the radar transmitting and receiving equipment.

These and other objects of the present invention, as will appear from a reading of the following specifiication are achieved in a preferred embodiment by the provision of FMCW airborne radar transmitting and receiving apparatus. The transmitter is adapted to radiate a doubly frequency modulated continuous carrier wave toward the earth via a directional antenna. The FMCW signal reflected by the earth is heterodyned in the receiver with a portion of the transmitted signal. Due to the altitude and velocity of the aircraft, the phase of the frequency modulation and the value of the carrier frequency of the reflected signal differ from those of the transmitted signal. A beat note is produced at the output of the receiver heterodyning circuit having a frequency modulated component whose mean frequency is related to aircraft velocity and whose frequency modulation index is a measure of aircraft altitude. The mean frequency of the beat signal component is determined by means of a closed loop Doppler frequency tracker. The modulation index of the frequency modulated beat signal component is ascertained by means of a closed loop altitude tracker. The frequency tracker and the altitude tracker share a common signal channel in which the mean frequency excursion and the frequency modulation index of the beat note component are reduced to arbitrarily low values by heterodyning techniques. The aforesaid reduction of frequency deviation is achieved by heterodyning the beat note component with a signal of appropriate frequency generated by the frequency tracker. The aforesaid reduction of frequency modulation index is affected by heterodyning the beat note component with a frequency modulated wave of proper frequency modulation index and phase generated by the altitude tracker. Aircraft velocity is determined by applying the signal generated by the frequency tracker to a discriminator which is centered on a frequency corresponding to zero aircraft velocity. Aircraft altitude is determined by applying the signal generated by the altitude tracker to a frequency modulation index determining circuit.

For a more complete understanding of the present invention, reference should be had to the following specification and to the figures of which:

FIG. 1 is a simplified block diagram of a preferred embodiment; and

FIG. 2 is a block diagram of a typical arrangement for instrumenting the coherent frequency sources included in the preferred embodiment of FIG. 1.

Referring to FIG. 1, the numeral 1 generally designates an air-borne radar transmitter for producing a doubly frequency modulated continuous wave carrier signal which is radiated toward the ground by directional antenna 2. As is well understood a plurality of directional antennas may be provided in a so called "Janus" configuration to facilitate the simultaneous computations of north-south and east-west velocity components. For sake of simplifying the presentation of the present invention, however, only one directional antenna and its associated transmitting and receiving apparatus will be described. It should be noted that the velocity and altitude data determining apparatus of the present invention is substantially the same in each receiver channel and may be fully understood without regard to any additional receiver channels that may be provided in a particular application.

Transmitter 1 comprises a transmitting oscillator 3 such as, for example, a klystron for producing the carrier signal whose frequency may be varied in response to a frequency control signal appearing on line 4. The control voltage, in turn, is produced by the addition in summing circuit 5 of two modulating signals appearing on line 6 and 7 respectively. The modulating signal of line 6 is derived from coherent frequency sources 8. To facilitate the explanation of the operation of the apparatus represented in the figure, typical frequency values will be ascribed to the pertinent signals. For example, it will be assumed that the signal appearing on line 6 has a nominal frequency of 450 kilocycles per second which is varied or "wobbulated" at the relatively low frequency of 0.5 cycle per second. As will be seen more fully later, the "wobbulation" of the 450 kc. signal substantially eliminates the effects of "altitude holes" in the determination of aircraft velocity and altitude. The signal appearing on line 7 will be assumed to be at 4 kc. Said 4 kc. signal and the "wobbulated" 450 kc. signal of line 6 are additively combined in circuit 5 to frequency modulate the carrier produced by oscillator 3 at the respective rates. The doubly frequency modulated carrier is coupled by duplexer 9 to antenna 2 and is radiated towards the earth. The energy reflected from the earth is received by antenna 2 and directed by duplexer 9 to a first input of receiver mixer 10.

One type of duplexer suitable for use in the present radar is the ortho-mode, or cross-polarized duplexer. In this case only those components of the reflected energy which are cross-polarized relative to the transmitted energy are applied to receiver mixer 10 by duplexer 9. This action affords a substantial amount of isolation between the transmitter and receiver whereby receiver discrimination in favor of reflected energy is enhanced. A suitable dual polarization duplexer is described in copending U.S. patent application S.N. 163,981, filed on January 3, 1962, in the name of Robert B. Ward and assigned to the present assignee. Any other means known in the art for isolating the receiver from the transmitted energy while permitting the reflected energy to be processed may be used.

A portion of the signal at the output of oscillator 3 is applied by coupler 11 to a first input of single sideband modulator 12. The second input (at the illustrative frequency of 35.1 mc.) to modulator 12 is obtained from frequency sources 8. Said 35.1 mc. signal is "wobbulated" in identical fashion as the signal appearing on line 6. The sum signal resulting from the heterodyning of the two input signals to modulator 12 is applied to the second input of mixer 10 wherein it is heterodyned with the signals reflected by the earth. The difference signal spectrum produced at the output of mixer 10 consists of a component at the center frequency (35.1 mc.-$f_d$) and sideband components at (35.1 mc.-$f_d$)±450 kc. (35.1 mc.-$f_d$)±900 kc., etc., where $f_d$ represents the Doppler frequency shift. Although most of the power in the signal spectrum is at the center frequency, it is preferable to use one of the sidebands in order to suppress signal leakage from the transmitter which is not entirely eliminated by duplexer 9. In particular, the third lower sideband frequency at 33.75 mc.-$f_d$ is selected by IF preamplifier 13 and applied to a first input of second mixers 14. It can be shown that the velocity data is present in the third sideband component as well as in the rejected center frequency component. The rejection of the center frequency component substantially eliminates any direct signal coupling between the transmitter and receiver at the transmitter carrier frequency.

The altitude "hole" problem previously alluded to arises in the case of a non-wobbulated frequency modulated continuous wave system wherein the round trip propagation delay of the transmitted and reflected signal is such as to cause an in-phase relationship between the phase of the reflected frequency modulated signal and the phase of the transmitted frequency modulated signal. In such a case, the frequency of the signal at the output of mixer 10 remains constant at 35.1 mc. The low frequency wobbulation imparted to the frequency modulated transmitter signal causes the altitudes at which the holes occur to be continuously shifted to other locations thereby minimizing the dwell time in the condition wherein a fixed frequency signal of 35.1 mc. is produced at the output of mixer 10 and no velocity data can be ascertained due to the absence of the sideband energy bearing the velocity data. Although the wobbulation of the transmitted carrier substantially eliminates the altitude hole problem, it is preferred to cancel out the frequency modulation at the wobbulation rate of the sideband energy at the output of mixer 10. Such a low frequency excursion would interfere with the proper operation of the Doppler frequency tracker and altitude tracker which are to be described later. The reflected signal energy is effectively "dewobbulated" as a result of the signal processing accomplished in modulator 12 and in mixer 10.

As previously mentioned, the signal at the output of IF preamplifier 13 is at the frequency 33.75 mc.-$f_d$ and is frequency modulated at a rate of 4 kc. The amount of frequency deviation of the 33.75 mc.-$f_d$ signal at the 4 kc. rate is a measure of the altitude of the aircraft for reasons similar to those described in the aforesaid U.S. Patent 2,268,587. The frequency modulated signal from preamplifier 13 is heterodyned in second mixers 14 with a signal at the illustrative frequency of 33.75 mc. applied via line 15 and derived from coherent frequency sources 8.

The signals obtained from preamplifier 13 and line 15 produce a difference frequency signal of $f_d$ which is frequency modulated at a 4 kc. rate in accordance with aircraft altitude. The difference frequency signal, in turn, is heterodyned with a 150 kc. signal derived from modulator 31 which also is frequency modulated at a 4 kc. rate in a manner to be described later. An output signal is produced on line 17 at a frequency of 150 kc.-$f_d$ having substantially no frequency modulation at the 4 kc. rate. The signal appearing on line 17 is applied by IF amplifier 18 to a first input of third mixer 19.

Mixer 19 is the input element of the Doppler frequency tracker 20 which further comprises tracker filter 21, frequency discriminator 22, amplifier-integrator 23, and variable frequency oscillator 24. Oscillator 24 operates at the illustrative nominal frequency of 400 kc. The operation of tracker 20 is such that a fixed frequency signal of 250 kc. is produced on line 25 irrespective of the value of $f_d$ at the output of amplifier 18. Oscillator 24 is constrained by the operation of the closed loop tracker 20 to follow any mean frequency variation in the signal at the output of amplifier 18 whereby frequency excursions of the signal on line 25 attributable to Doppler shift are substantially eliminated at the output of mixer 19. It should be noted that the frequency deviation of oscillator 24 from its nominal frequency of 400 kc. is a direct measure of $f_d$. Accordingly, the output of oscillator 24 may be applied to a frequency discriminator (not shown) centered at 400 kc. to produce a signal whose amplitude is proportional to $f_d$ (hence aircraft velocity) as measured along the microwave energy beam radiated by directional antenna 2 toward the earth. Alternatively, the oscillator output may be combined with oscillators measuring the center frequency of other beams to give outputs which are measures of the sum and differences velocities along the beam axes. These outputs may be fed into counters which may be arranged to measure distance traveled along coordinate axes of some arbitrary, but fixed, directions relative to the antenna beam axes.

The remaining apparatus is provided to determine the altitude of the aircraft carrying the air-borne navigational radar represented in FIG. 1. As already stated, the transmitted signal is frequency modulated by the 4 kc. signal appearing on line 7. Consequently, at other than zero altitude, the sideband energy passed by preamplifier 13 is also frequency modulated at a 4 kc. rate. The extent of the frequency deviation (frequency modulation index) at the 4 kc. rate is proportional to aircraft altitude. Any 4 kc. frequency modulation not entirely eliminated in mixers 14 is rejected by tracker filter 21 of Doppler frequency tracker 20 by the inclusion therein of a filter with bandwidth less than 4 kc.

The altitude-bearing frequency modulated signal on line 25 is applied via amplitude limiter 26 to frequency discriminator 27. Discriminator 27 produces an output signal whose amplitude is proportional to the instantaneous frequency of the 4 kc. frequency modulated signal on line 25. The peak amplitude of the signal at the output of discriminator 27 is extracted by conventional coherent detector 28 which also receives a 4 kc. reference signal via line 29 from the output of altitude modulation oscillator 30. The average value of the signal produced by detector 28 is derived by low pass filter 32 as a direct current signal and is applied to a first input of modulator 33. Modulator 33 is driven by a 400 cycle reference oscillator from source 34 which oscillation is also applied to servo motor 35 and potentiometer 44. The 400 cycle amplitude modulated signal from modulator 33 is applied via servo amplifier 36 to control the servo motor 35.

Shaft 37 of motor 35 simultaneously determines the settings of amplitude control 38, phase control 39, slider 40 of potentiometer 42 and slider 43 of potentiometer 44. Amplitude control 38 is energized by the 4 kc. signal output from oscillator 30 and produces an output signal on line 45 at the frequency of 4 kc. and having an amplitude determined by the displacement of shaft 37. The signal on line 45 is applied to phase control 39 and, via phase shift network 46, to line 7 at the input to summing circuit 5. As previously mentioned, the signal on line 7 frequency modulates the transmitter carrier generated by oscillator 3.

Phase control 39 produces an output signal at 4 kc. whose phase is determined by the angular displacement of shaft 37. Said output signal energizes potentiometer 42 and is applied via slider 40 to modulator 31 which also receives a 150 kc. signal on line 47 at the output of coherent frequency sources 8. Modulator 31 produces a 150 kc. signal on line 16 frequency modulated at a 4 kc. rate. The frequency modulation index and the phase of the frequency modulation of the signal on line 16 are determined by the angular displacement of shaft 37 of motor 35.

In operation, the signal of lines 15 and 16 convert the third sideband signal component at the output of preamplifier 13 to a signal at 150 kc. on line 17 having substantially no frequency modulation at a 4 kc. rate. To the extent that the 4 kc. modulation is not entirely eliminated, the error or residual modulated signal passes through amplifier 18, mixer 19 and limiter 26 and is detected by discriminator 27, detector 28 and low pass filter 32. In this manner, the residual 4 kc. frequency modulation appearing on line 17 is converted to a corresponding direct current at the output of filter 32. The corresponding direct current is converted to a 400 cycle servo control signal in modulator 33 and applied to motor 35 via amplifier 36. Motor 35 is driven by the servo control signal in such a sense and by that amount to control the frequency modulation index and the phase of the frequency modulation of the signal on line 16 to substantially eliminate any 4 kc. frequency modulation on the signal at the output of mixers 14. Thus, the action of the altitude tracker servo loop (14, 18, 19, 26, 27, 28, 32, 33, 36, 35, 37, 30, 38, 39, 42, and 31) substantially eliminates any 4 kc. frequency modulation on the signal on line 17. The altitude tracker produces an angular displacement of shaft 37 proportional to aircraft altitude. Said shaft displacement is converted to a convenient analog form at the slider 43 of potentiometer 44 as a 400 cycle alternating signal whose amplitude is a measure of aircraft altitude.

It will be observed that the altitude tracker and the Doppler frequency tracker 20 share third mixer 19 and line 25 which are common to both servo loops. Moreover, the altitude tracker and Doppler frequency tracker receive their respective data signals from the same receiving channel comprising antenna 2, duplexer 9, receiver mixer 10 and preamplifier 13. In this manner, altitude and velocity data is extracted with minimum component expenditure in a frequency modulated continuous wave radar system and without sacrifice of the data determining accuracy inherent in a system of that type.

The block diagram of FIG. 2 represents a typical embodiment of the coherent frequency sources 8 of FIG. 1. Illustrative frequency values have been assigned to the various elements in FIG. 2 commensurate with the typical frequency values assumed in connection with the description of FIG. 1. Accordingly, crystal oscillator 50 produces an output signal at a substantially constant frequency of 11.25 mc. (megacycles per second). The output signal is jointly applied to frequency multiplier 51 and to a first input of mixer 52. Multiplier 51 produces in a conventional manner an output signal on line 15 at 33.75 mc. for application to mixers 14 of FIG. 1.

Variable frequency oscillator 53 generates a signal having a nominal frequency of 11.7 mc. Said signal is "wobbulated" or varied in frequency about its nominal frequency by the .5 c.p.s. frequency modulating signal generated by wobbulator 54. The wobbulated signal is jointly applied to frequency multiplier 55 and to limiter 56. Multiplier 55, like multiplier 51, produces an output signal at a frequency three times the frequency of the signal applied thereto. The output signal at 35.1 mc. (wobbulated) is applied via limiter-power amplifier 57 to modulator 12 of FIG. 1. Crystal oscillator 58 produces a signal on line 47 at the substantially constant frequency of 150 kc. for application to modulator 31 of FIG. 1.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. Radar apparatus comprising
   means for transmitting a doubly frequency modulated carrier wave toward a reflecting object,
   means for heterodyning signals reflected from said object with said wave to produce a beat note having a frequency modulated component whose mean frequency and frequency modulation index are related to the velocity and range, respectively, of said object relative to said radar apparatus,
   first means coupled to said heterodyning means for determining the frequency modulation index of said component,
   and second means coupled to said heterodyning means for determining the mean frequency of said component.

2. Radar apparatus comprising
   means for transmitting a doubly frequency modulated carrier wave toward a reflecting object,
   means for heterodyning signals reflected from said object with said have to produce a beat note having frequency modulated center frequency and sideband components whose means frequencies and frequency modulation indexes are related to the velocity and range, respectively, of said object relative to said radar apparatus,
   frequency selective means coupled to said heterodyning means for selecting one of said sideband components,
   first means coupled to said frequency selective means for determining the frequency modulation index of the selected component,
   and second means coupled to said frequency selective means for determining the mean frequency of said selected component.

3. Air-borne radar apparatus comprising
   means for transmitting a doubly frequency modulated continuous wave toward the earth,
   means for heterodyning signals reflected from the earth with said wave to produce a beat note having a frequency modulated component whose mean frequency and frequency modulation index are related to the velocity and altitude, respectively, of the craft carrying said radar apparatus,
   first closed loop means coupled to said heterodyning means for determining the frequency modulation index of said component,
   and second closed loop means coupled to said heterodyning means for determining the mean frequency of said component.

4. Air-borne radar apparatus comprising
   means for transmitting a doubly frequency modulated continuous wave toward the earth,
   means for heterodyning signals reflected from the earth with said wave to produce a beat note having frequency modulated center frequency and sideband components whose means frequencies and frequency modulation indexes are related to the velocity and altitude, respectively, of the craft carrying said radar apparatus, frequency selective means coupled to said heterodyning means for selecting one of said sideband components, a closed loop altitude tracker coupled to said frequency selective means for determining the frequency modulation index of the selected component, and a closed loop frequency tracker coupled to said frequency selective means for determining the mean frequency of said selected component.

5. In a radar receiver producing a first frequency modulated signal having a frequency modulation index related to the range of a reflecting object relative to said receiver, means for determining said index comprising, a signal mixer coupled to receive said first frequency modulated signal and a second frequency modulated signal, a frequency discriminator coupled to the output of said mixer, a signal amplitude detector coupled to the output of said discriminator, a source of said second frequency modulated signal adapted to receive and responsive to a frequency modulating signal, a source of said frequency modulating signal, and means coupled between the output of said detector and said source of said frequency modulating signal for determining the amplitude and phase of said frequency modulating signal in accordance with the output of said detector.

6. Radar apparatus comprising means for transmitting a doubly frequency modulated continuous carrier wave toward a reflecting object, a first signal mixer for heterodyning signals reflected from said object with said wave to produce a beat note having a frequency modulated component whose mean frequency and frequency modulation index are related to the velocity and range, respectively, of said object relative to said radar apparatus, a signal channel including second and third signal mixers connected in cascade and coupled to the output of said first mixer, first closed loop means coupled to said second mixer for reducing toward zero the frequency modulation index of said component in said channel, and second closed loop means coupled to said third mixer for maintaining the mean frequency of said component at a predetermined value in said channel.

7. Radar apparatus comprising means for transmitting a doubly frequency modulated continuous carrier wave toward a reflecting object, a first signal mixer for heterodyning signals reflected from said object with said wave to produce a beat note having frequency modulated center frequency and sideband components whose mean frequencies and frequency modulation indexes are related to the velocity and range, respectively, of said object relative to said radar apparatus, frequency selective means coupled to said first mixer for selecting one of said sideband components, a signal channel including second and third signal mixers connected in a cascade and coupled to the output of said frequency selective means, first closed loop means coupled to said second mixer for reducing toward zero the frequency modulation index of said selected component in said channel, and second closed loop means coupled to said third mixer for maintaining the mean frequency of the selected component at a predetermined value in said channel.

8. Air-borne radar apparatus comprising means for transmitting a doubly frequency modulated continuous wave toward the earth, a first signal mixer for heterodyning signals reflected from the earth with said wave to produce a beat note having a frequency modulated component whose mean frequency and frequency modulation index are related to the velocity and altitude, respectively, of the craft carrying said radar apparatus, a signal channel including second and third signal mixers connected in cascade and coupled to the output of said first mixer, first closed loop means coupled to said second mixer for determining the frequency modulation index of said component, and second closed loop means coupled to said third mixer for determining the mean frequency of said component.

9. Air-borne radar apparatus comprising means for transmitting a doubly frequency modulated continuous wave toward the earth, a first signal mixer for heterodyning signals reflected from the earth with said wave to produce a beat note having frequency modulated center frequency and sideband components whose mean frequencies and frequency modulation indexes are related to the velocity and altitude, respectively, of the craft carrying said apparatus, frequency selective means coupled to said first mixer for selecting one of said sideband components, a signal channel including second and third signal mixers connected in cascade and coupled to the output of said frequency selective means, first closed loop means coupled to said second mixer for determining the frequency modulation index of the component selected by said frequency selective means, and second closed loop means coupled to said third mixer for determining the mean frequency of said selected component.

References Cited by the Examiner

UNITED STATES PATENTS

| | | | |
|---|---|---|---|
| 2,451,822 | 10/48 | Guanella | 343—14 |
| 2,875,434 | 2/59 | Lipinski et al. | 343—9 |
| 3,013,262 | 12/61 | Tollefson | 343—14 |
| 3,054,104 | 9/62 | Wright et al. | 343—14 |
| 3,112,481 | 11/63 | Goldberg | 343—14 |

CHESTER L. JUSTUS, *Primary Examiner.*